UNITED STATES PATENT OFFICE.

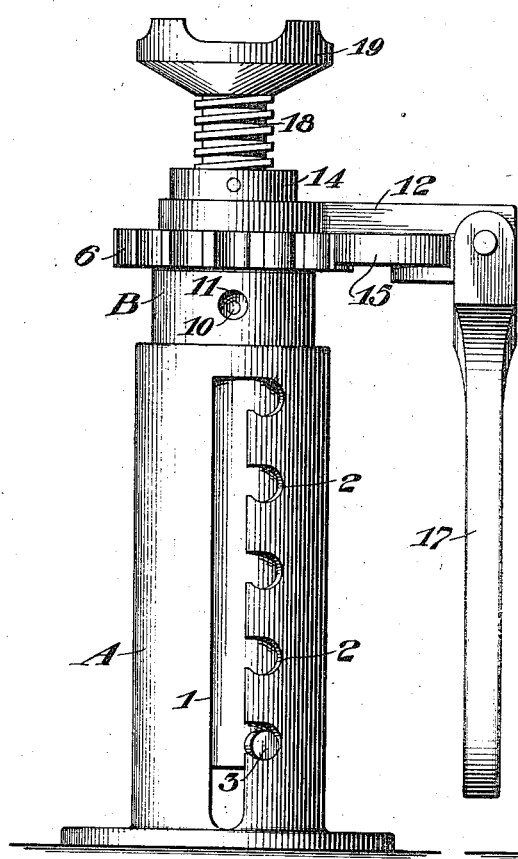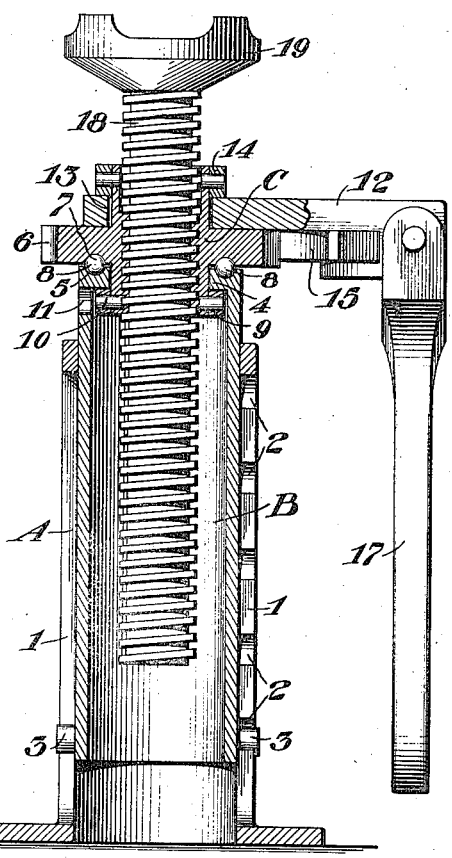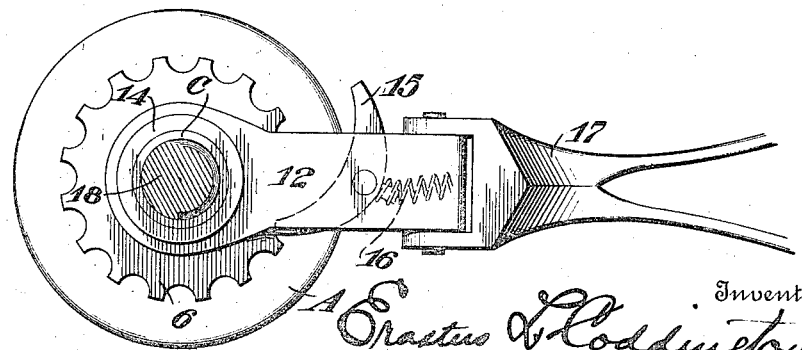

ERASTUS L. CODDINGTON, OF VANBUREN, INDIANA, ASSIGNOR OF ONE-HALF TO CHARLES M. STUART, OF MARION, INDIANA.

LIFTING-JACK.

964,394.  Specification of Letters Patent.  Patented July 12, 1910.

Application filed October 11, 1909. Serial No. 522,035.

*To all whom it may concern:*

Be it known that I, ERASTUS L. CODDINGTON, a citizen of the United States, residing at Vanburen, in the county of Grant and State of Indiana, have invented certain new and useful Improvements in Lifting-Jacks, of which the following is a specification.

My invention relates to an improvement in lifting jacks, and the object is to provide means whereby vehicles or other bodies may be lifted.

The invention consists of certain novel features of construction and combinations in parts which will be hereinafter described and pointed out in the claims.

In the accompanying drawings:—Figure 1 is a view in side elevation; Fig. 2 is a vertical sectional view; and Fig. 3 is a sectional view.

A represents the hollow body or standard which is provided with vertical slots 1, 1, and on the opposite walls of the slots are recesses 2, 2. Mounted in the body is a stem B which is provided with lugs 3, 3, on the sides thereof which are adapted to be received in the vertical slots and adapted to be received in the recesses 2 when it is desired to elevate the stem in the body A. The upper end of the stem B is in-turned, forming an annular flange 4, and on the upper surface of the flange a ball race 5 is formed. A sleeve C is received within the stem B, and a ratchet wheel 6 is integrally connected thereto, which wheel rests upon the flange 4 of the stem B. A ball race 7 is formed on the under side of the ratchet wheel, and balls 8 are received in the race formed in the races 7 and 5, forming a ball-bearing connection between the ratchet wheel and the stem, allowing the ratchet wheel to revolve together with the sleeve C without creating any friction. The lower end of the sleeve C is secured in the stem B by a collar 9 which is secured thereto by pins 10, the collar being received beneath the flange 4 of the stem B. The pins are driven into the collar 9 and sleeve C through an opening 11 formed in the stem B. An arm 12 is provided with an opening 13 through which the sleeve C projects, and the arm is supported and held upon the sleeve by means of a collar 14. Pivotally mounted upon the arm is a double faced pawl 15; a spring 16 engages one end of the pawl and is connected to the arm 12, whereby one face of the pawl will be caused to engage the ratchet wheel 6 when the other face of the pawl is out of engagement with the teeth of the ratchet wheel. A lever or handle 17 is pivotally connected to the arm, which is adapted to be used in the operating of the arm for causing the rotation of the ratchet wheel. The sleeve C is screw-threaded on its interior surface, and a screw-threaded post 18 is adapted to be received in the collar, the screw threads of the post engaging the screw threads of the sleeve. A head 19 is mounted on the post, which is adapted to engage the axle of the vehicle on the body to be lifted.

In the operation, the head 19 is placed beneath the object to be raised, when the handle is grasped, causing the ratchet wheel to be rotated. The post 18 does not rotate, but the rotation of the ratchet wheel will cause the post to move upwardly, causing the body resting upon the head to be raised. The sleeve C does not move either upwardly or downwardly, except when the stem B is raised or lowered for obtaining the proper adjustment for the post 18 in raising the body.

The stem B and sleeve C are capable of a vertical movement upwardly or downwardly by a sliding action. The ratchet wheel is capable of a rotary action in the stem B and the post is movable vertically by the screw action.

All of the parts can be brought together and assembled into a small space whereby the jack can be easily carried in a vehicle without requiring very much space.

Having fully described my invention, what I desire to secure by Letters Patent is:—

1. A lifting jack comprising a standard, a stem slidably mounted therein, lugs for connecting the stem to the standard for supporting it at different elevations, a ratchet wheel rotatably mounted on the stem, a post having screw-threaded engagement with the wheel, and means for rotating the ratchet wheel whereby the post is caused to move.

2. A lifting jack comprising a standard, a stem adjustably supported within the standard, a sleeve connected to and rotatably mounted in the stem, a post movably mounted in the sleeve, and means for operating the sleeve whereby the post is moved vertically.

3. A lifting jack comprising a standard, a stem adjustably supported on the standard, a sleeve rotatably mounted in the stem, a ratchet wheel on the sleeve, a post having screw-threaded engagement with the sleeve, an arm loosely mounted on the sleeve, pawls on the arm adapted to engage the teeth of the ratchet wheel, and a pivoted lever connected to the arm causing the ratchet wheel to be operated.

4. A lifting jack comprising a standard having vertical slots therein and recesses formed on the opposite walls of the slots, a stem slidably mounted in the standard, lugs on the stem adapted to be received in the recesses for supporting the stem at different elevations, a ratchet wheel rotatably mounted on the stem, a post having threaded engagement with the ratchet wheel, and means for rotating the ratchet wheel for causing the post to move.

In testimony whereof I affix my signature, in the presence of two witnesses.

ERASTUS L. CODDINGTON.

Witnesses:
ALONZO R. CODDINGTON,
Mrs. R. A. REDDING.